(12) United States Patent
Gaiser (10) Patent No.: US 11,572,817 B2
(45) Date of Patent: Feb. 7, 2023

(54) EXHAUST GAS HEATING ARRANGEMENT (71) Applicant: Purem GmbH, Neunkirchen (DE)

(72) Inventor: Gerd Gaiser, Reutlingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/402,177

(22) Filed: Aug. 13, 2021

(65) Prior Publication Data
US 2022/0049638 A1     Feb. 17, 2022

(30) Foreign Application Priority Data

Aug. 14, 2020  (DE) .................... 10 2020 121 414.6

(51) Int. Cl.
*F01N 3/20*    (2006.01)
*F01N 3/26*    (2006.01)

(52) U.S. Cl.
CPC ............. *F01N 3/2026* (2013.01); *F01N 3/26* (2013.01); *F01N 2240/16* (2013.01)

(58) Field of Classification Search
CPC ...... F01N 2240/16; F01N 3/2013; F01N 9/00; H05B 2203/014; H05B 2203/022; H05B 3/48; H05B 3/16; H05B 3/06; B01J 8/0496; F24H 3/0405
See application file for complete search history.

(56) References Cited

U.S. PATENT DOCUMENTS

| | | | | |
|---|---|---|---|---|
| 2,905,919 A * | 9/1959 | Lorch | ............. | H05B 3/56 338/214 |
| 5,149,508 A * | 9/1992 | Bullock | ............. | F01N 13/0097 422/174 |
| 5,562,885 A * | 10/1996 | Bayer | ............. | F01N 3/281 422/174 |
| 5,569,455 A * | 10/1996 | Fukui | ............. | B01D 53/945 422/174 |
| 7,252,809 B2 * | 8/2007 | Bruck | ............. | F01N 3/2006 422/222 |
| 8,409,516 B2 * | 4/2013 | Kim | ............. | F01N 13/017 422/177 |
| 2014/0190151 A1 | 7/2014 | Culbertson et al. | | |
| 2016/0153334 A1 | 6/2016 | Assalve et al. | | |
| 2018/0119591 A1 | 5/2018 | Everly et al. | | |
| 2019/0112962 A1 | 4/2019 | Gaiser | | |
| 2020/0240305 A1 | 7/2020 | Gaiser | | |
| 2020/0300141 A1 | 9/2020 | Gaiser | | |

FOREIGN PATENT DOCUMENTS

| | | |
|---|---|---|
| DE | 10 2005 011 657 A1 | 9/2006 |
| DE | 10 2019 101 679 A1 | 7/2020 |
| DE | 10 2019 107 384 A1 | 9/2020 |
| EP | 3 669 453 A1 | 8/1995 |

(Continued)

*Primary Examiner* — Anthony Ayala Delgado
(74) *Attorney, Agent, or Firm* — Walter Ottesen, P.A.

(57) ABSTRACT

An exhaust gas heating arrangement includes a heating unit having a jacketed heating element having a jacket and at least one heating conductor which extends in the jacket and is surrounded by insulating material. The heating unit is spirally wound surrounding a longitudinal center axis (L), wherein a radially inner winding end region of the heating unit is offset with respect to a radially outer winding end region of the heating unit in the direction towards the longitudinal center axis (L).

19 Claims, 4 Drawing Sheets

(56) References Cited

FOREIGN PATENT DOCUMENTS

| | | |
|---|---|---|
| EP | 2 826 973 A1 | 1/2015 |
| EP | 3 473 827 A1 | 4/2019 |
| JP | H0699079 A | 4/1994 |
| JP | 7-238825 A | 9/1995 |
| JP | 2001-65331 A | 3/2001 |
| JP | 2002235530 A | 8/2002 |
| JP | 2016-503854 A | 2/2016 |

* cited by examiner

EXHAUST GAS HEATING ARRANGEMENT

CROSS REFERENCE TO RELATED APPLICATION

This application claims priority of German patent application no. 10 2020 121 414.6, filed Aug. 14, 2020, the entire content of which is incorporated herein by reference.

TECHNICAL FIELD

The present disclosure relates to an exhaust gas heating arrangement for an exhaust gas system of a combustion engine.

BACKGROUND

The demand for minimal emission of pollutants from combustion engines in vehicles, which is increasingly coming to the fore, requires special measures which can reduce the emission of pollutants in particular in a starting phase of the combustion engine. Such measures include in particular measures which serve to bring exhaust gas treatment units, such as, for example, catalytic converters or particle filters, arranged in an exhaust gas system to operating temperature as quickly as possible, so that they are already capable of carrying out a catalytic reaction at an exhaust gas temperature that is still comparatively low in the starting phase.

There is known from U.S. 2020/0240305 an exhaust gas heating unit which can be arranged in an exhaust gas stream upstream of an exhaust gas treatment unit. The exhaust gas heating unit comprises a jacketed heating element having a jacket composed, for example, of metal material, and a heating conductor which is received in the interior of the jacket embedded in insulating material. By applying an electric voltage to the connection ends of the heating conductor, the heating conductor is energized and thereby delivers heat to the outside via the jacket. On the outside of the jacket there is provided a heat transfer surface formation in the form of a heat transfer element that surrounds the jacket in helically wound form. This heat transfer element increases the surface area via which, on energization of the heating conductor, heat can be delivered to the exhaust gas flowing around such an exhaust gas heating unit.

U.S. 2020/0300141 discloses an exhaust gas heating element in which, in order to increase the surface area available for the delivery of heat, a heat transfer surface formation having a heat transfer element wound in a meandering manner is provided. The heat transfer element has a plurality of heat transfer element portions which are arranged in succession substantially parallel to one another and are connected together by respective curved portions of the meandering structure, which heat transfer element portions are passed through by the jacketed heating element and are in heat transfer contact with the jacket of the jacketed heating element. A heating unit constructed with such an exhaust gas heating element can be structured such that the exhaust gas heating element, spirally wound about a longitudinal center axis, is held between carrier structures arranged axially on both sides thereof, so that, substantially over the entire cross section of an exhaust gas routing housing containing such a heating unit, thermal interaction of the exhaust gas flowing therein with the heating unit can be produced.

SUMMARY

An object of the present disclosure is to provide an exhaust gas heating arrangement which, while being of compact construction, achieves efficient transfer of heat to exhaust gas flowing around it.

This object is achieved according to an aspect of the disclosure by an exhaust gas heating arrangement including a heating unit having a jacketed heating element having a jacket and at least one heating conductor which extends in the jacket and is surrounded by insulating material, wherein the heating unit is spirally wound surrounding a longitudinal center axis, wherein a radially inner winding end region of the heating unit is offset with respect to a radially outer winding end region in the direction towards the longitudinal center axis.

Because the spirally wound heating unit of the exhaust gas heating arrangement constructed according to the invention is not arranged lying substantially in a plane orthogonal to the longitudinal center axis but is axially extended, the length of the jacketed heating element that is available for heat transfer is increased relative to the cross-sectional area through which the exhaust gas flows, which in turn results in an improved heat input into the exhaust gas flowing around such a heating unit.

In order to be able to increase the surface area available for heat transfer still further, it is proposed that the heating unit comprises a heat transfer surface formation carried on the jacket.

Since heat is made available very quickly in the region of the surface of the jacket, or of the heat transfer surface formation, during operation of an exhaust gas heating arrangement according to the disclosure, even if the temperature of the exhaust gas flowing around the heating unit is still comparatively low, an efficient reduction of the amount of pollutants contained in the exhaust gas can be achieved at a very early stage during start-up of a combustion engine, or of the associated exhaust gas system, if the heating unit has in the region of the jacket or/and in the region of the heat transfer surface formation an outer surface constructed with catalytically active material.

The largest possible heat transfer surface using the available volume can be ensured, for example, in that the heat transfer surface formation comprises at least one heat transfer element which surrounds the jacketed heating element in a helical manner, or/and in that the heat transfer surface formation comprises a plurality of disk-like heat transfer elements arranged in succession in a longitudinal direction of the jacketed heating element, or/and in that the heat transfer surface formation comprises at least one heat transfer element which extends in a meandering manner along the jacketed heating element and through which the jacketed heating element passes in respective heat transfer element portions, or/and in that the heat transfer surface formation has a substantially round, preferably circular, outer circumferential contour.

The heating unit can be arranged in an exhaust gas routing housing which is elongated in the direction of the longitudinal center axis, wherein it is proposed, for particularly efficient interaction with the exhaust gas stream, that the radially inner winding end region of the heating unit is arranged upstream, relative to an exhaust gas main flow direction in the exhaust gas routing housing, with respect to the radially outer winding end region of the heating unit.

Such a structure with the radially inner winding end region arranged in the upstream direction is advantageous for a compact configuration in particular when the exhaust gas routing housing has a housing region which widens radially in the exhaust gas main flow direction and the heating unit is arranged at least in part in the radially widening housing region.

Downstream of the heating unit there can be arranged an exhaust gas treatment unit, preferably a catalytic converter unit or/and a particle filter unit, which is then also heated in the starting phase by the exhaust gas stream heated by the heating unit.

In order to be able to utilize the flow conditions prevailing inside an exhaust gas routing housing for efficient interaction of the exhaust gas stream with the heating unit, it is proposed that in at least one, preferably each, circumferential region, an opening angle of the radially widening housing region relative to the longitudinal center axis is smaller than a heating unit setting angle, relative to the longitudinal center axis, of a heating unit setting line which intersects the longitudinal center axis and at least two, preferably all, of the winding portions of the heating unit in the region of a center of the jacketed heating element in the at least one circumferential region.

It can thereby preferably further be provided that the exhaust gas treatment unit has an inflow side which is oriented in the upstream direction and inclined at an exhaust gas treatment unit setting angle relative to the longitudinal center axis, and that in at least one, preferably each, circumferential region, the heating unit setting angle is smaller than the exhaust gas treatment unit setting angle.

Both in respect of the thermal interaction of the exhaust gas stream with the heating unit arranged in an exhaust gas routing housing, and in respect of a compact construction, it is particularly advantageous if the heating unit setting angle is smaller than or equal to half the sum of the opening angle and the exhaust gas treatment unit setting angle.

A very efficient transfer of heat to the exhaust gas stream can be achieved in that in at least one, preferably in each, circumferential region, at least two, preferably all, of the mutually directly adjacent winding portions of the heating unit overlap radially, or/and in that in at least one, preferably in each, circumferential region, at least two, preferably all, of the mutually directly adjacent winding portions of the heating unit overlap axially. Cross-sectional regions in which the exhaust gas stream has substantially no thermal interaction with the heating unit can thus largely be avoided.

In order nevertheless to avoid excessive throttling of the exhaust gas stream, it is further proposed that in at least one, preferably each, circumferential region, at least two, preferably all, of the mutually directly adjacent winding portions of the heating unit do not overlap, preferably are at a distance from one another, in the direction of a heating unit setting line which intersects the longitudinal center axis and at least two, preferably all, of the winding portions of the heating unit in the region of a center of the jacketed heating element in the at least one circumferential region.

Interaction of the heating unit with the exhaust gas stream also in the central region, that is, in the region of the longitudinal center axis, can be achieved in that the radially inner winding end region intersects the longitudinal center axis.

In a construction that is particularly simple to implement in particular in respect of integration into an exhaust gas routing housing having a housing portion that widens radially in the exhaust gas flow direction, it is proposed that in at least one, preferably each, circumferential region, at least some, preferably all, of the winding portions of the heating unit lie with a center of the jacketed heating element on a linearly extending heating unit setting line which intersects the longitudinal center axis. A substantially conical structure of the heating unit is thus achieved.

In an alternative form, in at least one, preferably each, circumferential region, at least some, preferably all, of the winding portions of the heating unit can lie with a center of the jacketed heating element on a curved, for example arcuately curved, heating unit setting line which intersects the longitudinal center axis.

In order to be able to accommodate the heating unit stably in an exhaust gas system, or an exhaust gas routing housing, it is further proposed that on at least one, preferably both, of the axial sides of the heating unit there is arranged a carrier structure which supports the heating unit axially.

BRIEF DESCRIPTION OF THE DRAWINGS

The invention will now be described with reference to the drawings wherein.

DESCRIPTION OF THE PREFERRED EMBODIMENTS

Figure 1:
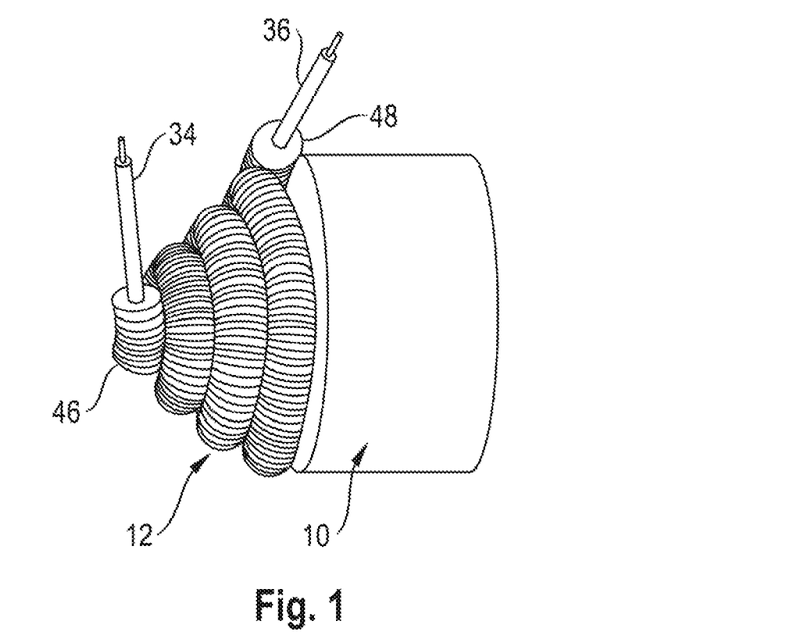
FIG. 1 is a perspective view of a heating unit of an exhaust gas heating arrangement upstream relative to an exhaust gas treatment unit.
Figure 2:
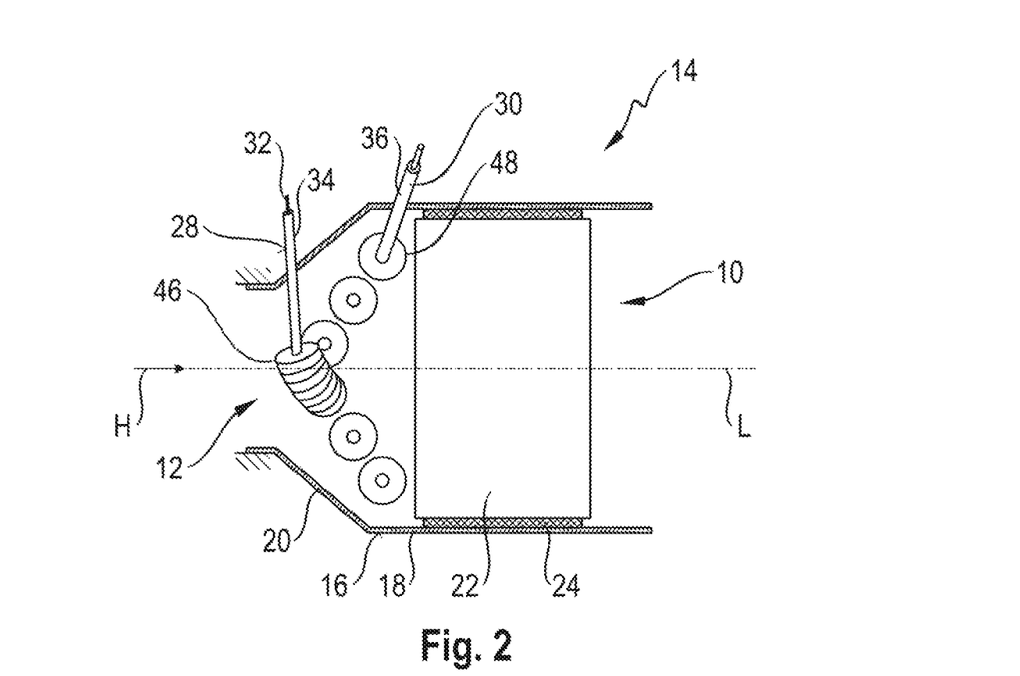
FIG. 2 is a longitudinal sectional view of an exhaust gas heating arrangement comprising the heating unit and the exhaust gas treatment unit of FIG. 1.

FIG. 1 shows, in a perspective view, an assembly group of an exhaust gas heating arrangement 14 shown in FIG. 2, which assembly group comprises an exhaust gas treatment unit 10 and a heating unit 12. The exhaust gas heating arrangement 14 further comprises an exhaust gas routing housing 16 having a substantially cylindrical housing region 18 which receives the exhaust gas treatment unit 10, and a housing region 20, adjoining the substantially cylindrical housing region 18 upstream in an exhaust gas main flow direction A, which widens radially with respect to a longitudinal center axis L. The exhaust gas treatment unit 10, which can be constructed, for example, as a catalytic converter unit, can have a catalytic converter block 22 coated with catalytically active material, which catalytic converter block is held, with the interposition of a fiber mat 24 or the like, in the substantially cylindrical housing region 18 of the exhaust gas routing housing 16.

The heating unit 12 is arranged upstream relative to the exhaust gas treatment unit 10 on an inflow side 26 thereof and comprises a substantially elongated jacketed heating element 28. The jacketed heating element 28 is constructed with a jacket 30, which is generally composed of metal material, and at least one heating conductor 32 extending in the jacket 30. In order to provide electrical insulation between the heating conductor 32 and the jacket 30, the heating conductor 32 in the jacket 30 is embedded in electrically insulating material, for example in powder form. In the two connection end regions 34, 36 lying outside the exhaust gas routing housing 16, the jacketed heating element 28 can be connected to a voltage source 37 (see FIG. 7), so that, by applying an electric voltage to the two connection end regions 34, 36, the heating conductor 32, and via the heating conductor the jacket 30, are heated.

Figure 6:
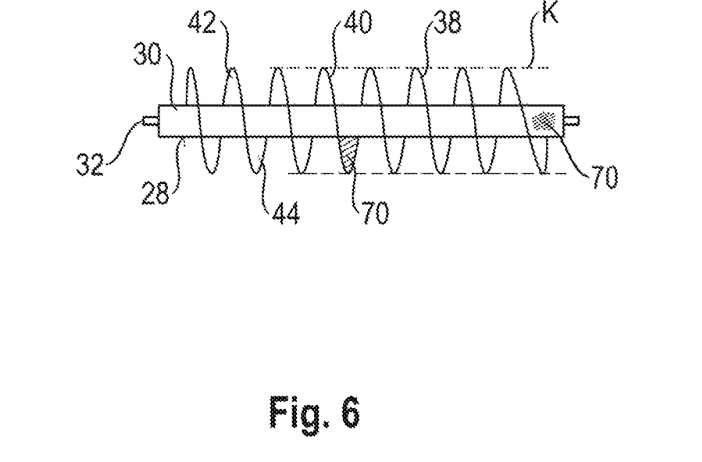
FIG. 6 is a side view of a heating unit, arranged so as to extend linearly, having a jacketed heating element and a heat transfer surface formation surrounding a jacket thereof; and, FIG. 7 shows, in a schematic illustration, an exhaust gas system for a combustion engine containing the exhaust gas heating arrangement of FIG. 2.

Attached to the outer circumference of the jacket 30, which is not integrated in the current flow, of the jacketed heating element 28 there is a heat transfer surface formation generally designated 38. The heat transfer surface formation 38 serves to increase the surface area available for the delivery of heat to exhaust gas flowing around the heating unit 12. An example of a jacketed heating element 28 surrounded by such a heat transfer surface formation 38 is shown in FIG. 6. In the embodiment shown, the heat transfer surface formation has a helically wound heat transfer element 40 extending along the jacket 30 of the jacketed heating element 28 in a longitudinal direction thereof. With its helically wound structure, the heat transfer element 40, which is, for example, likewise composed of metal material, provides two heat transfer surfaces 42, 44 extending in the manner of a coil in the longitudinal direction of the jacketed heating element 28. The heat transfer element 40 provides an outer circumferential contour which is preferably circular and is defined radially on the outside with respect to the heating conductor 32 by contour lines K.

It should be pointed out that the heat transfer surface formation 38 could also be constructed with a different structure. For example, it could comprise a plurality of disk-like heat transfer surface formations, for example with a circular outer circumferential contour, arranged in succession in the longitudinal direction of the jacketed heating element 28, through which heat transfer surface formations the jacketed heating element passes, for example, in a central region. In a further alternative form, the heat transfer surface formation 38 could comprise a heat transfer element wound in a meandering manner, which heat transfer element comprises a plurality of heat transfer element portions which, in the case of a linear extent of the jacketed heating element, are arranged substantially parallel to one another. The jacketed heating element 28 can pass through such heat transfer element portions in central regions, for example between respective curved portions connecting the adjacent heat transfer element portions together.

The connection of the jacketed heating element 28 to the heat transfer surface formation 38 can be established, for example, by producing the heat transfer surface formation 38 with a shape-memory material. The openings through which the jacketed heating element 28 is to pass, for example in the central region of the heat transfer surface formation, can be provided by cold forming such that they have a slightly larger diameter than the jacketed heating element 28. After the jacketed heating element 28 has been inserted into such openings, the heat transfer surface formation 38 composed of the shape-memory material can contract again by heating, so that a high clamping force with respect to the jacketed heating element is achieved and a firm and durable connection is thus achieved without the need to produce, for example, a substance-to-substance connection.

FIGS. 1 and 2 clearly show that the heating unit with the jacketed heating element 28 and the heat transfer surface formation 38 surrounding it is arranged so as to surround the longitudinal center axis L in a spirally wound manner, so that the radial distance from the longitudinal center axis L increases along the wound structure of the jacketed heating element 28 surrounded by the heat transfer surface formation 38. The heating unit 12 is further so constructed that, in the spirally wound structure, a radially inner winding end region 46 is axially offset with respect to a radially outer winding end region 48 in the direction towards the longitudinal center axis L. It can be seen in FIG. 2 that the axial offset is chosen such that the radially inner winding end region 46 is offset relative to the radially outer winding end region 48 in the upstream direction, that is, contrary to the exhaust gas main flow direction A, and is thus positioned at a greater distance from the inflow side 26 of the exhaust gas treatment unit 10.

Figure 7:
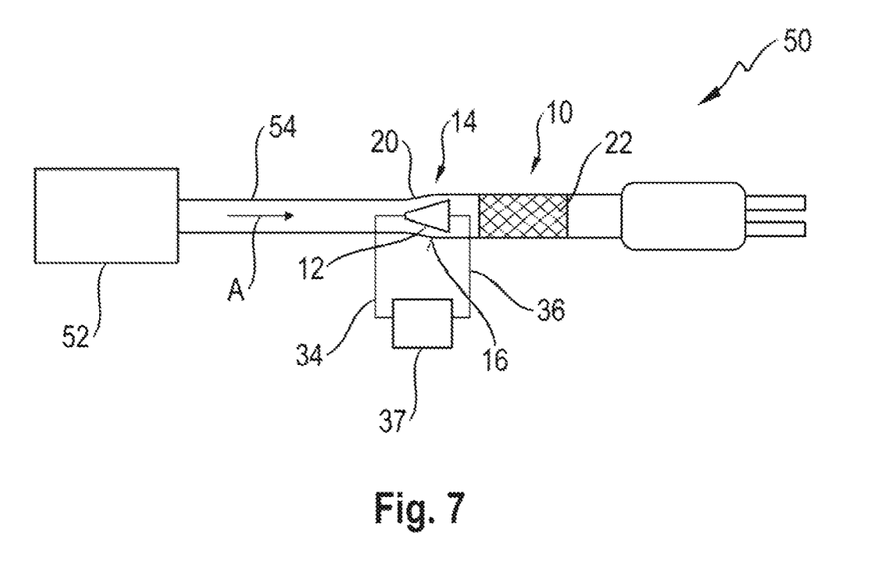

With this substantially conical structure of the heating unit 12, various advantages are achieved during operation of the heating unit 12, or of an exhaust gas system 50 for a combustion engine 52 constructed therewith and shown schematically in FIG. 7. On the one hand it will be seen that the heating unit 12 with its axially extended, spiral structure is so positioned that it is positioned at least in part in the radially widening housing region 20 which is, for example, likewise constructed with a conical or cone-like structure. A compact construction is thus ensured, in which the exhaust gas, which flows in, for example, through an exhaust gas routing pipe 54 in the exhaust gas main flow direction A, is guided in a defined manner in the direction towards the radially further extended inflow side 26 of the exhaust gas treatment unit 10, while flowing around the heating unit 12. A thermal interaction of the heating unit 12 with the exhaust gas stream guided to the exhaust gas treatment unit 10 is thus also ensured, as will be explained in greater detail hereinbelow. For efficient utilization of the available installation space it can also be provided, for example, that the last winding portion, which also comprises the radially outer winding end region 48, of the spiral structure of the heating unit 12 is positioned substantially completely in the substantially cylindrical housing region 18 of the exhaust gas routing housing 16, so that thermal interaction of the heating unit 12 with the exhaust gas stream can also be ensured upstream relative to the exhaust gas treatment unit 10 in the radially outermost region of the exhaust gas treatment unit 10.

The spirally wound, axially extended structure of the heating unit 12 further has the effect that the total available length of the jacketed heating element 28 surrounded by the heat transfer surface formation 38 can be increased significantly compared to a spiral structure substantially in one plane, that is, not extended axially. As a result, the surface area of the jacket 30 and of the heat transfer surface formation 38 that is available for heat transfer to the exhaust gas is increased, which contributes towards more efficient heating of the exhaust gas stream flowing to the exhaust gas treatment unit 10.

Figure 3:
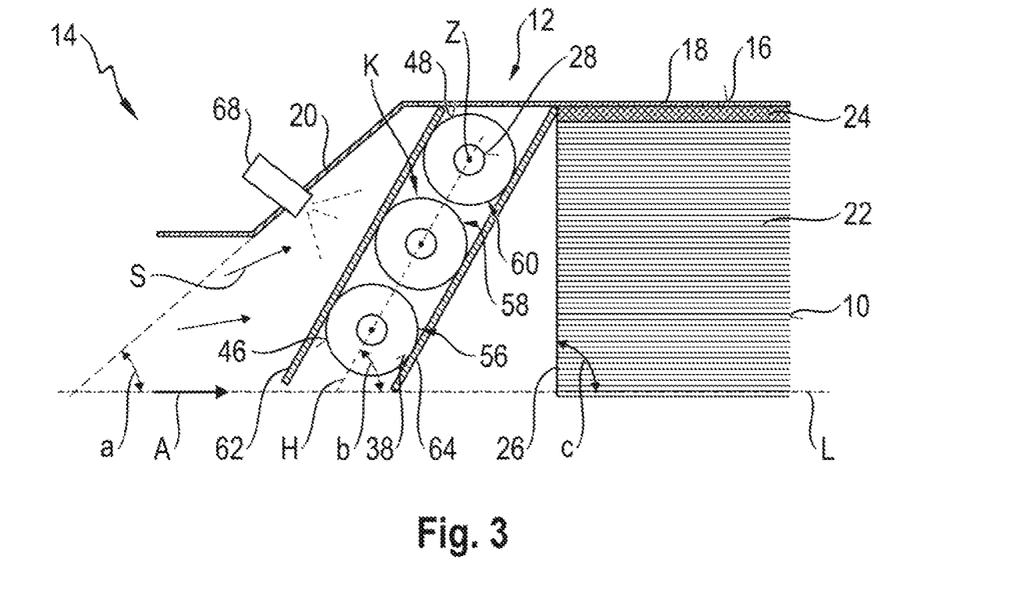
FIG. 3 is a partial longitudinal sectional view which shows, in a schematic illustration, the construction of the exhaust gas treatment arrangement of FIG. 2.
Figure 4:
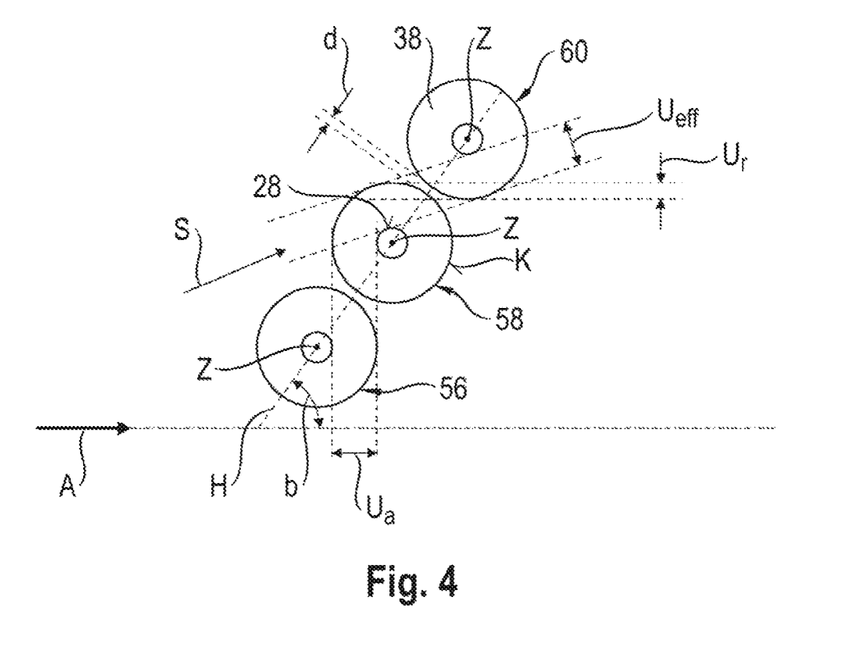
FIG. 4 is a detail view of three winding portions of a heating unit of the exhaust gas heating arrangement of FIG. 2 that are positioned directly adjacent to one another.
Figure 5:
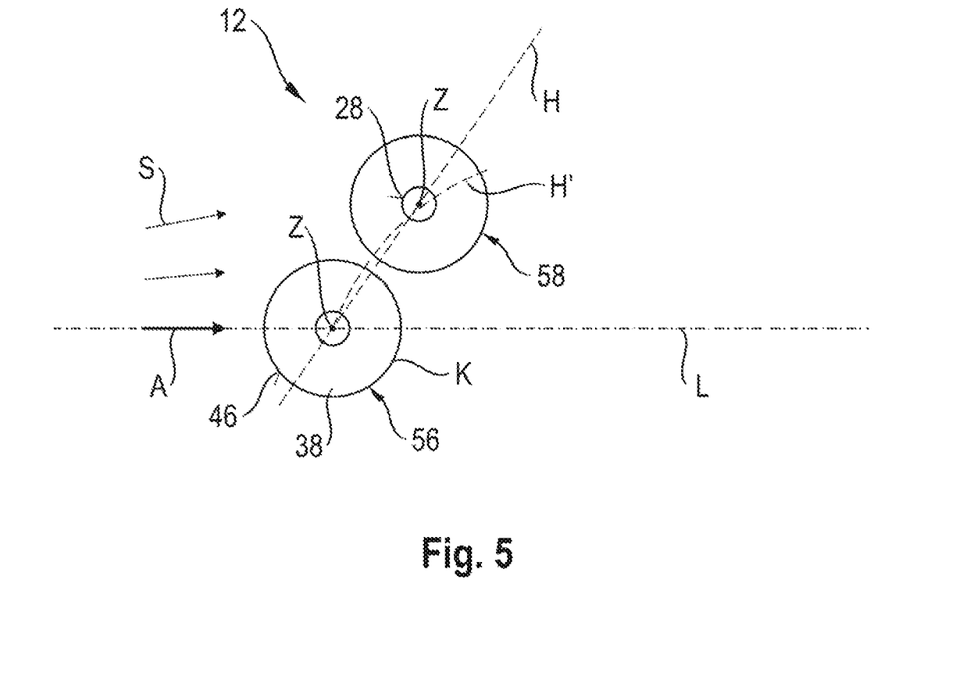
FIG. 5 is a view corresponding to FIG. 4 which illustrates further alternative forms.

With reference to FIGS. 3 to 5, aspects of the structural configuration of the exhaust gas heating arrangement 14 constructed according to the invention will be explained hereinbelow.

FIG. 3 shows, in a plane which contains the longitudinal center axis L and represents a circumferential region of the exhaust gas heating arrangement 14, or of the heating unit 12, three mutually adjacent winding portions 56, 58, 60 of the heating unit 12, wherein the winding portion 60 positioned in FIG. 3 at the top and at the furthest distance from the longitudinal center axis L provides the radially outer winding end region 48, and the winding portion 56 shown at the bottom and thus closest to the longitudinal center axis L provides the radially inner winding end region 46. In each of the winding portions 56, 58, 60, a center Z, defined, for example, by the heating conductor 32 or the mid-point thereof, of the jacketed heating element 28 lies on a heating unit setting line H, which extends linearly from radially on the inside to radially on the outside at a heating unit setting angle b relative to the longitudinal center axis L and thus also to the exhaust gas main flow direction A. The winding portions 56, 58, 60 of the heating unit 12 arranged in this manner are held, or axially supported, between two carrier structures 62, 64 arranged axially on both sides thereof. In order to allow exhaust gas to pass through, these carrying structures 62, 64 can be of lattice-like or cross-like form and fixed in their radially outer region to the exhaust gas routing housing 16.

The inclination of the heating unit setting line H represented by the heating unit setting angle b, which substantially also represents the cone angle of the conical structure of the heating unit 12, is also chosen, in consideration of the winding pitch of the heating unit 12, so that the winding portions 56, 58, 60 in a, or in each, circumferential region that are adjacent to one another about the longitudinal center axis L overlap in the radial direction and in the axial direction. The overlap is thereby considered in each case in relation to the outer circumferential contours, represented by the contour lines K, of the winding portions of the heating unit 12, which in the embodiment shown is or are defined by the outer circumferential contour of the heat transfer surface formation 38 and in the embodiment shown accordingly have in each case a substantially circular outer circumferential shape. There is thus a radial overlap Ur between the mutually directly adjacent winding portions 56, 58, 60, and there is an axial overlap $U_a$ of the mutually directly adjacent winding portions 56, 58, 60. Furthermore, the winding portions 56, 58, 60 are so positioned that, in one, or in each, circumferential region, the centers Z lying on the heating unit setting line H are at such a distance from one another in the direction of the heating unit setting line H that the individual winding portions 56, 58, 60 do not overlap, advantageously are at a distanced from one another.

In consideration of the flow guidance in the exhaust gas routing housing 16, the heating unit setting angle b relative to the longitudinal center axis L is so chosen that it is larger than an opening angle a of the radially widening housing region 20 of the exhaust gas routing housing 16. Furthermore, the heating unit setting angle b is so chosen that it is smaller than an exhaust gas treatment unit setting angle c of the inflow side 26 of the exhaust gas treatment unit 10. In the case of a substantially planar inflow side 26, the exhaust gas treatment unit setting angle c can be 90°.

It has been found to be advantageous if the heating unit setting angle b is approximately halfway between or smaller than the exhaust gas treatment unit setting angle c and the opening angle a of the radially widening housing region 20, so that the heating unit setting angle b is smaller than or equal to half the sum of the exhaust gas treatment unit setting angle c and the opening angle a of the radially widening housing region 20. It should be pointed out that, with regard to this angle, in the case of a structure that differs from a substantially rotationally symmetrical configuration, it is possible in each case to consider an average angle or the angles to be compared with one another in defined regions in the direction of the longitudinal center axis L and in the circumferential direction.

With such a conical structure it is ensured that the exhaust gas stream, which, as the distance from the longitudinal center axis L increases, has a flow direction that increasingly deviates from the exhaust gas main flow direction A and is increasingly oriented radially outwards, flows to the heating unit 12 such that a thermal interaction between the exhaust gas and the heating unit 12 that is as efficient as possible is achieved. It is thereby important that, with the exhaust gas stream, or the flow direction S thereof, increasingly deviating radially outwards from the exhaust gas main flow direction A, there is obtained, based on the positioning of the mutually overlapping winding portions 56, 58, 60, an effective overlap $U_{eff}$ which is significantly greater than the radial overlap Ur or also the axial overlap $U_a$. Accordingly, in each of the winding portions around which exhaust gas flows, efficient thermal interaction of the exhaust gas stream with the surface region, positioned in a respective winding portion, or a respective circumferential region, both of the jacketed heating element 28 and of the heat transfer surface formation 38 is ensured. Nonetheless, the distance d between the individual winding portions ensures that excessive flow damming, or an excessively great flow resistance, does not occur for the exhaust gas stream passing through the heating unit 12. Also, as a result of this distance d, owing to the avoidance of mutual contact of the directly adjacent winding portions 56, 58, 60, good durability of the heating unit 12 so constructed is achieved. Regions in which the exhaust gas stream does not occur substantially without thermal interaction with any of the winding portions are, however, largely avoided.

It should be pointed out that the effective overlap $U_{eff}$ is determined substantially by the heating unit setting angle b. The smaller this angle, the more pointed the conical structure of the heating unit 12 and the smaller the angle between the heating unit setting line H and the flow direction S of the exhaust gas stream in regions that are radially further away from the longitudinal center axis L. As small a distance d as possible also contributes to a large effective overlap $U_{eff}$.

Various modifications of the heating unit 12 are to be seen in the schematic of FIG. 5. It will be seen in FIG. 5 that the radially inner winding portion 56, which also provides the radially inner winding end region 46, is positioned further radially inwards, so that it is intersected by the longitudinal center axis L, for example, in the region of the center Z of the jacketed heating element 28. This ensures that there is no cross section, even in the central region, in which exhaust gas could flow through without thermal interaction with the heating unit 12.

FIG. 5 further illustrates that, again relative to a circumferential region, the centers Z of the jacketed heating element 28 in a respective winding portion 56, 58 do not necessarily have to lie on a heating unit setting line H that extends linearly but can also lie, for example, on a curved, preferably arcuately curved, heating unit setting line H' which, as illustrated in FIG. 5, can be convexly curved or also concavely curved relative to the exhaust gas stream. It should be emphasized that the positioning of the centers Z on such a curved heating unit setting line H' is then of course reflected in the structure of the heating unit 12 as a whole, when more than two winding portions are considered, since a linearly extending line can of course always be drawn through two winding portions.

With such a positioning of the centers of the individual winding portions 56, 58 on a curved heating unit setting line H', the enveloping surface of the heating unit 12 as a whole, which is defined by the outer circumferential contour, or contour line K, of the heat transfer surface formation 38, also lies on a line extending correspondingly convexly or concavely, in each case again relative to a circumferential region. The setting of such a line H' explained hereinbefore with reference to FIGS. 3 and 4 can be considered, for example, in the radially inner region, that is, where such a heating unit setting line H' intersects the longitudinal center axis L, but can also be considered by an average setting angle of such a curved heating unit setting line H'.

It should further be pointed out that, for reasons of symmetry, substantially the same structure, that is, approximately the same profile of the heating unit setting line H or H', can preferably be provided in the longitudinal center axis L over the entire circumference.

With the exhaust gas heating arrangement 14 constructed according to the invention, which comprises the heating unit 12, constructed with a structure wound spirally and in an axially extended manner, upstream of an exhaust gas treatment unit 10, it is ensured that, in particular in a starting phase of the combustion engine 52, the exhaust gas which is to flow to the exhaust gas treatment unit 10 is efficiently heated and this heat is then also introduced into the exhaust gas treatment unit, or the catalytically active material thereof. Accordingly, it is possible to significantly reduce the period of time in which, in a starting phase of the operation of the combustion engine 52, an exhaust gas treatment unit 10 is not sufficiently warm to carry out the catalytic reaction that is to be performed therein.

The efficiency of the exhaust gas heating arrangement 14, or of the heating unit 12, can be further improved by spraying onto the heating unit 12 hydrocarbon, that is, for example, also the fuel used in the combustion engine 52. For example, this can take place by an injector 68 which is positioned upstream relative to the heating unit 12 and is illustrated in FIG. 3. The hydrocarbon that strikes the heating unit 12 in heating operation thereof is reacted owing to the temperature prevailing there, whereby additional heat of reaction is liberated and can be transported via the exhaust gas stream into the exhaust gas treatment unit 10 positioned downstream. In particular when the combustion engine 52 is a diesel combustion engine and the exhaust gas treatment unit 10 comprises an SCR catalytic converter or/and a diesel particle filter, these system regions can thus be brought very quickly to operating temperature. This effect can also be achieved by operating the combustion engine 52 such that, by a defined ignition angle setting, a portion of the fuel is not burned therein but is ejected unburned and is thus transported with the exhaust gas stream to the heating unit 12.

In order to achieve a further reduction in the emission of pollutants in particular in the starting phase of the operation of the combustion engine 52, the heating unit 12 can be provided in the region of the outer surface of the jacket 30 or/and on the heat transfer surface formation 38 with a surface having catalytically active material 70. Since, on energization of the jacketed heating element 28, this catalytically active material 70 can very quickly be heated and thus brought to a required temperature for carrying out the catalytic reaction, a catalytic reaction and thus a reduction in the amount of pollutants in the exhaust gas is thus already achieved upstream of the exhaust gas treatment unit 10.

If the exhaust gas treatment unit 10, in the case of a combustion engine 52 in the form of a petrol engine, comprises a three-way catalytic converter, the catalytically active material can be provided by a coating, for example with platinum or/and palladium or/and rhodium. If the combustion engine 52 is a diesel engine and the exhaust gas treatment unit is accordingly a diesel oxidation catalytic converter, the catalytically active material can be provided, for example, by a coating with platinum or/and palladium. A corresponding coating can also be provided when use as an NOx storage catalytic converter in a combustion engine 52 in the form of a diesel engine is provided, wherein there can be provided as the storage component, for example, a barium-containing compound.

If the exhaust gas treatment unit 10 comprises an SCR catalytic converter in association with a combustion engine 52 in the form of a diesel engine, the catalytically active material can be a hydrolysis catalyst, which performs the processing of a urea/water solution which is to be carried out upstream of the SCR catalytic converter. For example, a coating which is composed of titanium dioxide, zirconium oxide or/and aluminum oxide can be provided for this purpose. In conjunction with an exhaust gas treatment unit 10 comprising an SCR catalytic converter, the catalytically active material 70 can also be composed, for example, with Fe zeolites, Cu zeolites or vanadium oxide (for example, vanadium pentoxide). In particular in the case of coating with such oxides, it is also possible to provide the catalytically active material in the form of a mixed oxide coating.

Such a coating can be applied, for example, by first applying to the surface of the jacket 30 or/and of the heat transfer surface formation 38 that is to be coated a so-called washcoat having a comparatively high Al content, for example FeCr alloy 1.4767 with an Al content of about 5%, wherein the surface to be coated can also be subjected to a heat treatment. With this washcoat there is achieved a porous oxide-ceramics coating which, owing to its porous structure, provides a large internal surface area to which the coating with the catalytically active material 70 can then be applied, for example by impregnation.

In the heating unit 12 described in detail hereinbefore, the structure, or positioning, of the mutually adjacent winding portions is in each case explained with reference to the outer circumferential contour of the heat transfer surface formation 38. This is the case in particular also for the axially and radially overlapping structure of mutually directly adjacent winding portions 56, 58, 60. Such a structure, in particular with the heat transfer surface formation 38, is particularly advantageous for providing as large a surface area as possible for the transfer of heat to the exhaust gas stream. Nevertheless, it should be pointed out that the spirally wound and axially extended structure with axially and radially overlapping winding portions of the heating unit 12 can in principle also be implemented when the heating unit comprises only the jacketed heating element 28 but no heat transfer surface formation provided on the jacket 30. The axially and radially overlapping relationship of mutually directly adjacent winding portions is then to be established in each case with reference to the outer circumferential contour of the jacket 30.

It is understood that the foregoing description is that of the preferred embodiments of the invention and that various changes and modifications may be made thereto without departing from the spirit and scope of the invention as defined in the appended claims.

What is claimed is:

1. An exhaust gas heating arrangement, comprising:
   a heating unit including a jacketed heating element;
   said jacketed heating element having a jacket and at least one heating conductor running in said jacket and said heating conductor being surrounded by insulating material;
   said heating unit being spirally wound surrounding a longitudinal center axis (L);
   said heating unit having a radial outer winding end region and a radial inner winding end region offset with respect to said radial outer winding end region in a direction toward said longitudinal center axis (L); and,
   said heating unit being subdivided into at least two winding portions extending between said radial outer winding end region and said radial inner winding end region directly adjacent to each other in at least one circumferential region.

2. The exhaust gas heating arrangement of claim 1, wherein said heating unit includes a heat transfer surface formation carried on said jacket.

3. The exhaust gas heating arrangement of claim 2, wherein said heating unit has an outer surface built up with catalytically effective material in at least one of the following: the region of said jacket and the region of said heat transfer surface formation.

4. The exhaust gas heating arrangement of claim 2, wherein said heat transfer surface formation includes at least one of the following:
 (a) a heat transfer element surrounding said jacketed heating element in a helical manner;
 (b) a plurality of disc-like heat transfer elements arranged in succession in a longitudinal direction of said jacketed heating element;
 (c) at least one heat transfer element running in a meandering manner along said jacketed heating element and through which said jacketed heating element passes in respective heat transfer element sections;
 (d) a substantially round outer circumferential contour; and,
 (e) a circular, outer circumferential contour.

5. The exhaust gas heating arrangement of claim 1, further comprising:
 an exhaust gas routing housing for conducting exhaust gas in an exhaust gas main flow direction (A);
 said exhaust gas routing housing being elongated in the direction of said longitudinal center axis (L);
 said heating unit being arranged in said exhaust gas routing housing; and,
 said radial inner winding end region being arranged offset upstream relative to said radial outer winding end region with reference to said exhaust gas main flow direction (A) in said exhaust gas housing.

6. The exhaust gas heating arrangement of claim 5, wherein:
 said exhaust gas routing housing has a radially widening housing region widening radially in the direction of said exhaust gas main flow direction (A); and at least one of:
  said heating unit being arranged at least in part in said radially widening housing region; and,
  an exhaust gas treatment unit disposed downstream of said heating unit.

7. The exhaust gas heating arrangement of claim 6, wherein said exhaust gas treatment unit is at least one of: a catalytic converter unit and a particle filter unit.

8. The exhaust gas heating arrangement of claim 6, further comprising:
 said radially widening housing region defining an opening angle (a) in at least one circumferential region of said exhaust gas heating arrangement relative to said longitudinal center axis (L);
 said jacketed heating element having a center (Z);
 said heating unit being subdivided into at least two winding portions conjointly defining a heater unit setting line (H) passing through the region of said center (Z) and intersecting said longitudinal center axis (L) at a heating unit setting angle (b) in said at least one circumferential region; and,
 said opening angle (a) being less than said heating unit setting angle (b).

9. The exhaust gas heating arrangement of claim 8, wherein:
 said exhaust gas treatment unit has an inflow side oriented toward upstream;
 said inflow side is further inclined at an exhaust gas treatment unit setting angle (c) relative to said longitudinal center axis (L); and,
 said heating unit setting angle (b) is less than said exhaust gas treatment unit setting angle (c) in at least one of the circumferential regions.

10. The exhaust gas heating arrangement of claim 9, wherein said heating unit setting angle (b) is less than or equal to half the sum of said opening angle (a) and said exhaust gas treatment unit setting angle (c).

11. The exhaust gas heating arrangement of claim 1, wherein
 (a) in at least one circumferential region, said at least two winding portions overlap radially; and,
 (b) in at least one circumferential region, said at least two winding portions overlap axially.

12. The exhaust gas heating arrangement of claim 1, wherein
 said jacketed heating element has a center (Z); and,
 in at least one circumferential region, said at least two winding portions are non-overlapping and are at a distance (d) from one another in the direction of a linearly extending heating unit setting line (H) intersecting said longitudinal center axis (L) and said winding portions in the region of said center (Z) in said at least one circumferential region.

13. The exhaust gas heating arrangement of claim 1, wherein said radially inner winding end region intersects said longitudinal center axis (L).

14. The exhaust gas heating arrangement of claim 1, wherein:
 said heating unit is subdivided into a plurality of winding portions and said jacketed heating element has a center (Z); and,
 at least some of said winding portions lie with said center (Z) on a linearly extending heating unit setting line (H) intersecting said longitudinal center axis (L).

15. The exhaust gas heating arrangement of claim 1, wherein:
 said heating unit is subdivided into a plurality of winding portions and said jacketed heating element has a center (Z); and,
 in at least one circumferential region, at least some of said winding portions of said heating unit lie with said center (Z) of said jacketed heating element on a curved or arcuately curved heating unit setting line (H') intersecting said longitudinal center axis (L).

16. The exhaust gas system of claim 1, further comprising:
 a carrying structure for supporting said heating unit;
 said heating unit having first and second axial sides; and,
 said carrier structure being arranged at least at one of said axial sides to axially support said heating unit.

17. An exhaust gas system for a combustion engine, comprising:
 an exhaust gas heating arrangement including:
 a heating unit including a jacketed heating element;
 said jacketed heating element having a jacket and at least one heating conductor running in said jacket and said heating conductor being surrounded by insulating material;
 said heating unit being spirally wound surrounding a longitudinal center axis (L);
 said heating unit having a radial outer winding end region and a radial inner winding end region offset with respect to said radial outer winding end region in a direction toward said longitudinal center axis (L);

an exhaust gas routing housing for conducting exhaust gas in an exhaust gas main flow direction, said exhaust gas routing housing being elongated in the direction of said longitudinal center axis, said heating unit being arranged in said exhaust gas routing housing, said radial inner winding end region being arranged offset upstream relative to said radial outer winding end region with reference to said exhaust gas main flow direction in said exhaust gas housing, said exhaust gas routing housing having a radially widening housing region widening radially in the direction of said exhaust gas main flow direction; and at least one of:

said heating unit being arranged at least in part in said radially widening housing region; and, an exhaust gas treatment unit being disposed downstream of said heating unit.

18. An exhaust gas heating arrangement, comprising:

a heating unit including a jacketed heating element;

said jacketed heating element having a jacket and at least one heating conductor running in said jacket and said heating conductor being surrounded by insulating material;

said heating unit being spirally wound surrounding a longitudinal center axis (L); and, said heating unit having a radial outer winding end region and a radial inner winding end region offset with respect to said radial outer winding end region in a direction toward said longitudinal center axis (L), wherein:

said heating unit is subdivided into at least two winding portions directly adjacent to each other and at least one of the following applies:

(a) in at least one circumferential region, said at least two winding portions overlap radially; and, (b) in at least one circumferential region, said at least two winding portions overlap axially.

19. An exhaust gas heating arrangement, comprising:

a heating unit including a jacketed heating element;

said jacketed heating element having a jacket and at least one heating conductor running in said jacket and said heating conductor being surrounded by insulating material;

said heating unit being spirally wound surrounding a longitudinal center axis (L);

said heating unit having a radial outer winding end region and a radial inner winding end region offset with respect to said radial outer winding end region in a direction toward said longitudinal center axis (L); and one of:

said heating unit is subdivided into a plurality of winding portions and said jacketed heating element has a center, at least some of said winding portions lying with said center on a linearly extending heating unit setting line intersecting said longitudinal center axis (L); and said heating unit is subdivided into a plurality of winding portions and said jacketed heating element has a center (Z), in at least one circumferential region, at least some of said winding portions of said heating unit lying with said center of said jacketed heating element on a curved or arcuately curved heating unit setting line intersecting said longitudinal center axis.

\* \* \* \* \*

UNITED STATES PATENT AND TRADEMARK OFFICE
CERTIFICATE OF CORRECTION

PATENT NO. : 11,572,817 B2
APPLICATION NO. : 17/402177
DATED : February 7, 2023
INVENTOR(S) : Gerd Gaiser It is certified that error appears in the above-identified patent and that said Letters Patent is hereby corrected as shown below:

On the Title Page

On Page 1:
Under FOREIGN PATENT DOCUMENTS, fourth line: delete "3 669 453" and insert --0 669 453-- therefor.

In the Specification

In Column 7:
Line 35: delete "distanced" and insert -- distance d -- therefor.

Signed and Sealed this
Fourth Day of April, 2023

Katherine Kelly Vidal
*Director of the United States Patent and Trademark Office*